March 6, 1945.  H. M. WHITTLESEY  2,371,007
BUSINESS INSTRUMENTS
Filed July 21, 1941  2 Sheets-Sheet 1

Inventor:
Harold M. Whittlesey
By Wallace & Cannon
Attorneys.

March 6, 1945.                H. M. WHITTLESEY                2,371,007
                              BUSINESS INSTRUMENTS
                          Filed July 21, 1941          2 Sheets-Sheet 2

FIG. 4.

Inventor:
Harold M. Whittlesey
By Wallace & Cannon
Attorneys.

Patented Mar. 6, 1945

2,371,007

UNITED STATES PATENT OFFICE 2,371,007

BUSINESS INSTRUMENT

Harold M. Whittlesey, Columbus, Ohio

Application July 21, 1941, Serial No. 403,357

2 Claims. (Cl. 283—1)

This invention relates to business instruments such as may be used as the bills of public utilities or the like, as tax notices of taxing bodies, such as municipal corporations and the like, as premium or other debit notices, such as are distributed by insurance and other companies, and in a wide variety of other instances.

Business instruments of the aforesaid character bear an identification particularizing, that is, characterizing, the instrument, and this identification is usually a name and address and related information. Additionally, such instruments bear variable data such as an amount being invoiced or billed or amounts concerning which notice is being given as by a taxing body or an insurance company. Furthermore, such instruments usually bear other data which, while they vary from instrument to instrument, are nevertheless of a class which reoccurs on a large number of instruments, such data being, for example, the rate schedule under which a customer of a public utility is billed, the tax rate, in instances where the business instruments are tax bills, the premium rate, in the instance of insurance companies, and other data of such a nature that, while they constitute a class group or classification, they are nevertheless related to the particularity of a given business instrument. Furthermore, such business instruments often bear what may well be called special data, such as the indication that an amount billed or noticed by a previous instrument has not been paid or some additional data, such as that a charge for merchandise purchased, in the case of a public utility bill, are to be included on the instrument as special or out of the ordinary data.

Thus, for example, in the case of a public utility bill, the name and address of the customer of the utility are printed on the bill to characterize the same; the consumption of the commodity or commodities distributed by the public utility, the variable data, are also indicated on the bill, as is the rate schedule or schedules under which the customer is billed and other kindred data such as the data which is utilized in analyzing the source of revenue of the public utility, indications as to whether or not a tax is to be paid on the amount billed, for in the case of municipal and eleemosynary corporations and the like it is not necessary for public utility corporations to pay a tax on the amount billed and, of course, there are other classification data of a nature somewhat like that pertaining to the revenue analysis which are included on public utility bills. Furthermore, special data, such as an indication that the account is in arrears, or that a charge is to be made for merchandise, are often included on a public utility bill.

For the purposes of describing this invention, the data which are included on public utility bills, tax bills, insurance notices and kindred business instruments may be said to generally fall into four different groups, the first of which is the identification or characterizing data usually, as stated hereinabove, the name and address, the second of which may be called the variable data which, for example, are amounts being billed or concerning which notice is being given and the like, the third is what may be called classification data, which occur in an identical form on a large number of business instruments, and the fourth is what may well be called special data.

I have observed in the course of preparation of business instruments of the aforesaid character, as this has been effected heretofore, that where a large number of business instruments of the aforesaid character are being prepared by a particular institution or the like, the same variable data, as they have been identified hereinabove, occur on a large number of instruments. Heretofore these data have been entered on the instruments as they are encountered in the course of preparation of the instruments, which is to say, the instruments are usually arranged according to the identifications appearing thereon, either alphabetically or in other grouping, as by being arranged according to street addresses, and in such instances the variable data entered on the instruments are usually unlike from instrument to instrument even though, as I have stated, the same data are entered on a large number of instruments in the course of the preparation of the entire group of such instruments.

The entry of variable data on instruments of the aforesaid character has usually been effected manually; for example, in the case of public utility billing, the operator of what was usually a printing calculating machine would pick up a particular business instrument bearing a particular identification and then, by referring to a source book, usually the book in which the meter readings were entered, would locate the particular items in the book pertaining to the identification on the bill, and thereafter the operator would insert the bill in the machine and then by manual manipulation enter the data from the source or meter reader's book on the bills. This operator also then referred to another source book or the like and ascertained what charge should be made for the consumption quantity and thereafter manually entered such data on the bill. It will be obvious that this was a slow and time-consuming task which has in the past been an appreciable portion of the high cost of preparing business instruments of the character to which this invention pertains.

Hence among the objects of the present invention is to enable the entry of data that have heretofore been entered on business instruments manually to be entered on such instruments by the use of automatically operating high speed machines, and a related object is to enable business instruments which are to receive identical data to be grouped so that the entry of such data thereonto may be expeditiously and economically effected.

In order to enable the aforesaid fundamental object of this invention to be attained, it is necessary that the business instruments be so formed that grouping thereof can be readily effected, and consequently another object of the present invention is to so form business instruments of the aforesaid character that the collecting thereof into groups, which will facilitate the preparation and utilization thereof, may be readily effected.

It will be appreciated that the collecting of business instruments into groups as aforesaid is primarily a sorting problem and while several methods for sorting business instruments are available, I have found it advantageous to so arrange business instruments of the aforesaid character that they may be sorted in accordance with the method disclosed in United States Letters Patent to Perkins No. 1,544,172, patented June 30, 1925, for by arranging business instruments for sorting by this method, visual verification of the results of sorting is facilitated since business instruments that are sorted by this method have slots or notches formed therein that extend to the edges of the instruments. Hence after the instruments have been sorted so as to be collected in what should be groups of instruments bearing, or to bear, corresponding data, the previously formed slots or notches which identify such group should be found to be aligned, and presence or absence of this alignment can be readily ascertained by comparing the slotting or notching in the instruments collected into a particular group. Hence, still another object of this invention is to so notch or slot business instruments that sorting thereof in accordance with the method disclosed in the aforesaid Perkins patent may be expeditiously effected.

In any instance where a plurality of business instruments are prepared and where such instruments are repeatedly handled prior to final distribution thereof, as by mailing of the instruments to persons whose names and addresses appear on the instruments, it is essential that a constant check be kept on the instruments to insure against loss or misplacing of any particular instrument once preparation of the instrument has been begun. I have found that this may be advantageously effected by consecutively numbering or otherwise designating the instruments in the course of preparation thereof so that the instruments may be arranged in accordance with such consecutive numbering or the like at any time which will, of course, reveal if any instrument is missing for a missing instrument will prevent arranging of the instruments in accordance with such consecutive numbering or the like. Thus, another object of the present invention is to so consecutively number or otherwise designate business instruments at an initial stage in the preparation thereof so that the loss or misplacing of a particular instrument may be quickly ascertained at any stage during the preparation of the business instruments or when preparation of the instruments is completed. An object ancillary to the foregoing is to so consecutively number business instruments that arranging thereof in accordance with such consecutive numbering may be expeditiously effected, and a further and related object is to enable the foregoing to be accomplished by producing representations of the number or the like in a system of consecutive numbering or the like in each business instrument so as to enable such representations to be used in sorting the instruments into the consecutively numbered or other relation represented thereon, and an ancillary object is to so produce such representations that sorting may be effected in accordance with the method disclosed in the aforesaid Perkins Patent No. 1,544,172.

In those instances where classification data, as hereinabove defined, are to be included on business instruments, such data are employed for accounting, statistical and like purposes, and thus still another object of my invention is to so include classification data on business instruments that the utilization thereof for accounting, statistical and like purposes may be expeditiously brought about, and an ancillary object is to so represent such classification data on business instruments that the representations may be utilized when accounting, statistical or like data are to be compiled, and a related object is to so afford such representations that in the course of compiling accounting, statistical or like data the instruments may be sorted by the method of the aforesaid Perkins patent.

Yet other objects of this invention are to enable what has been called special data hereinabove to be incorporated on business instruments and particularly representations of such data that may be utilized in the sorting of the instruments in accordance with the presence or absence of such representations on the instruments.

Other and further objects of the present invention will be apparent from the following description and claims and are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

Further and more specific objects of the present invention will be apparent from the following description in which reference is made to the accompanying drawings wherein Fig. 1 is an elevational view showing one face of a partially prepared business instrument of the present invention;

Fig. 2 is an elevational view showing the other face of the business instrument shown in Fig. 1;

Fig. 3 is a view similar to Fig. 2 but showing the business instrument at still another stage in the course of preparation thereof; and Fig. 4 is a view, similar to Figs. 2 and 3, showing a completed business instrument of the present invention.

It is to be understood that the public utility bill illustrated in the accompanying drawings is but a selected embodiment of my invention for, as has been explained hereinabove, business instruments of this invention may be utilized in a wide variety of ways as, for example, not only by public utility companies but also by taxing bodies, insurance companies and the like.

As can be ascertained by reference to Figs. 1 and 2, the bill, generally indicated by 10, of suitable heavy paper or the like is divided into a plurality of sections and in the present instance the bill includes a main body 10a constituting the accounting stub or portion thereof, a remittance stub 10b and a customer's stub 10c. These sections are defined in the bill 10, in the present instance, by printed lines 11 and 12 which extend transversely across one face of the bill and serve as guides along which the bill may be conveniently divided into its sections. It will be understood, however, that one or both of the printed lines might be supplanted by a score line so as to facilitate division of the bill 10 into its various sections.

In practice, the customer's stub 10c and the remittance stub 10b are mailed to the customer of the utility while the accounting stub 10a is retained by the utility for accounting and like purposes. While the illustrated bill 10 comprises three sections, it will be understood that a business instrument of the present invention might embody a greater or less number of sections, or might consist of but a single section, without departing from the purview of the invention, the number of sections included in the bill being dependent upon characteristics and requirements of the accounting and statistical systems of which the bill is a part.

As can be best ascertained by reference to Figs. 1 and 2, the bill 10 has constantly reoccurring data printed thereon, such as, in the present instance, lines dividing the main body and stubs into areas usually adapted to receive variable data, as defined above, identifications, also a part of the reoccurring data, being printed in association with the areas thus defined for the purpose of identifying the variable or like data printed therein. The reoccurring data, in the present instance, also comprise the name of the utility and the address thereof, instructions with respect to the use of the various sections, the date on or before which payment is due, dates identifying the period to which the bill pertains, a return address and kindred data.

As will be explained in further detail hereinafter, the practice of the present invention entails sorting the bills of this invention into groups and irrespective of the manner in which the bills are to be sorted, it is essential that they all be arranged and faced in a corresponding manner when the sorting is to be done. Thus, as is common in those instances where business instruments are to be sorted, one corner of the instruments is cut away and in the present instance a free corner of the main body or accounting stub 10a is cut away, as indicated at 13, the corresponding corner being cut away on each of the bills of the present invention.

Reference has been made hereinabove to the fact that I have found it advantageous to effect the sorting entailed in the practice of the present invention in the manner disclosed in the above referred to Perkins Patent No. 1,544,172. This method of sorting involves providing perforations along selected margins of the business instruments, or sections thereof, and then by selectively notching the business instruments from determined of such perforations to the adjacent edge thereof, particularity is imparted to each instrument which enables the sorting to be effected. It will be understood, however, that the sorting might be effected in a wide variety of other ways but, as in the present instance where the sorting is to be effected in the manner disclosed in the aforesaid Perkins patent, rows of perforations P are formed along each of the marginal edges of the main body 10a and the free edge of the accounting stub 10c. It is to be understood that other rows of perforations along other marginal edges of sections of the bill might be provided if desired or required.

In the case of public utility bills, which have been selected for the purpose of describing the present invention, each of the bills that are to be sent out at a given time is arranged in the manner thus far described and, if desired, such bills may be printed in a conventional printing machine, the corners may be chamfered by conventional cutting means, and the aforesaid rows of perforations may be produced in the bills in a conventional perforating machine. In event the bills are prepared in this manner a plurality of such blank bills may be arranged in the sheet feeding means of a machine of a character explained hereinafter so that the sheets may be withdrawn and fed to and through the machine one at a time, a sheet feeding means suitable for the purpose being that disclosed, for example, in Gollwitzer Patent No. 2,002,773, patented May 28, 1935.

Another way in which blank bills as aforesaid may be prepared is to sever the length of the bills from the width of a web of suitable heavy paper or the like fed to a machine of the character disclosed in Hartley Patent No. 2,041,183, patented May 19, 1936, and, as explained in that patent, the aforesaid reoccurring data and the like that are to be printed on the bills may be printed thereon during passage thereof through such a machine. However, where the sorting of the bills is to be effected in accordance with the disclosure of the above referred to Perkins patent and perforations are to be formed along marginal edges of the bills or sections thereof, it is advantageous to prepare the bills in a machine wherein not only the bills can be cut and printed, as is done in accordance with the disclosure in the aforesaid Hartley patent, but also the necessary perforations may be formed therein as well as the aforesaid corner cutting operation.

In the case of a public utility bill, the classification data that are to appear on a particular bill will be definitely related to the identification, the name and address that appear on the bill. Such classification data in the case of a public utility bill will be, among other things, the rate schedule under which a customer of the utility is to be billed. Rate schedules of a public utility are primarily predicated upon the potential demands of the customer for the commodity being distributed by the utility. Since it is to the advantage of the utility to have the customer use the distributed commodity in an amount closely approaching the potential demands of the customer, resort is usually had to a rate schedule such that a customer pays a particular rate for consumption up to a given quantity of the commodity but as the amount of consumption of the commodity increases the rate at which the customer is charged decreases, resort being had to such rate schedule so as to compensate the company for being equipped to meet the potential demands of the customer and, in a measure, to compensate the customer for utilizing the quantities of the commodity in an amount approaching, equalling or exceeding the potential demands of the customer. Since different customers will have different potential demands, a number of different rate schedules are established and each customer is assigned a proper rate schedule. Each such rate schedule is identified as by having a designation letter or number or both assigned thereto.

Among other classification data that are customarily represented on a public utility bill is that which identifies the nature of a customer, which is to say, these data signify whether the customer is using the commodity in a residence or for the purpose of lighting a store or for power or heating purposes in a factory or the like or for street lighting, in the case of a municipal corporation, and in a wide variety of other usages of the commodity. These data are customarily included on public utility bills for the purpose of enabling the utility to determine what percentages or quantities of its commodity are being used by various kinds of its customers. In public utility billing, classification data of this nature are frequently referred to as revenue accounts and customarily each such account, as a residence, or lighting for a store or the like has a designation such as an account number assigned thereto. Of course, each customer falls into one or the other of such revenue accounts, and such a designation usually appears on a bill for the customer in the form of the revenue account number or a representation of such a number, this also being true with respect to the rate schedule designation.

Additionally, in the case of public utilities, taxes need be paid on the amounts billed to certain customers but need not be paid in the case of other customers as, for example, municipal and eleemosynary corporations and the like are tax free. Thus other classification data, indicating whether or not a tax is to be paid on an amount billed the particular customer to which the bill pertains, appear on the bill. Furthermore, some utilities desire to ascertain whether or not the bill pertains to consumption of the commodity on a farm and whether or not this is true is indicated by data appearing on the bill. Particularly in the case of public utilities, other classification data or representations thereof appearing on the bill indicate whether or not the bill is what may be called a regular bill or whether it is a final bill, as in the case where a customer moves from a given location and no further bills are to be sent to the customer for consumption of the commodity at the old location. There are many other varieties of classification data that may be included on public utility bills. Furthermore, it will be appreciated that in the case of other business instruments, as for example, tax bills, data or representations thereof pertaining to the tax rate advantageously appear on tax bills, and in the case of insurance companies, data characterizing the notice as to whether it is for a life insurance policy, an accident insurance policy, a fire insurance policy or the like are advantageously represented or otherwise produced on the notice as is, for example, the rate upon which the charge to which a notice pertains is predicated.

In the present instance representations of classification data are produced in the business instruments by producing representations of numbers in the instruments, the numbers thus selectively represented being respectively indicative of, for example, a particular rate schedule or revenue account or the like. Furthermore, these representations are preferably produced under the code described in Nevin Patent 2,041,085, patented May 19, 1936.

The code disclosed in the aforesaid Nevin patent utilizes four units for representing the digits in any given order of a particular number and the representations of a particular number are afforded by extending either one slot from a particular perforation P or two slots from perforations P in the particular field on the instrument in which the number is to be represented. By referring to Fig. 1 and to the upper right-hand corner of the instrument shown therein, it will be noted that the term "Rate schedule" is associated with three different fields, the most left hand of which in Fig. 1 includes but three perforations in the present instance since it has been found that for the purpose of representing rate schedules it will not be necessary to represent an entire notation in the highest order of the number. In the present instance, in association with the term "Rate schedule" as it appears in Fig. 1, slots 25 and 26 are formed in two of the fields so as to thereby represent a rate schedule designated by the number 220.

Yet further, in public utility billing, each different class of service, that is whether it be a residence, a store or the like, is assigned to what is known as a revenue account number and by referring to Fig. 1 it will be seen that fields of perforations P are associated with the designation "Revenue account number." In this particular field two notches 27 and 28 are formed to represent the number 30 which designates a particular revenue account.

Furthermore, in public utility billing it is advantageous to distinguish between so-called regular bills and so-called special bills, a final bill for a particular customer being an example of a special bill. Thus on the instrument as shown in Fig. 1 in association with certain fields of perforations the term "Others" appears and in the present instance a notch 29 is extended from one of the perforations associated with this term to the adjacent edge of the card, such a notch being formed to indicate that the particular instrument shown in Fig. 1 is a so-called regular bill. If it were a special bill, then a notch as 29 would not be formed. It will be understood that the other perforations associated with the term "Others" as it appears on Fig. 1 could be utilized to designate other special conditions of which the aforesaid example of a special and regular bill is merely exemplary.

In the course of preparing the instrument for public utility billing as shown in Figs. 1 and 2, certain data pertaining to the customer are printed on each of the sections of the bill. Thus in the present instance as shown in Fig. 1, the name and address of the customer and certain accounting data represented by numerals are printed on the main body of the instrument as indicated at 30. However, on the stub 10b only the accounting data are printed as indicated at 31, while on the remittance stub 10c only the name and address of the customer are printed as indicated at 32.

In public utility billing the so-called meter reader's book is the primary source of the information to which a particular bill is to pertain.

and in preparing the bills and in the handling thereof it is customary to relate the bills to a particular meter reader's book, and in this respect it is customary to assign to the different meter readers' books a particular number. Moreover, as will be explained presently in the course of preparing the business instruments such as the utility bill illustrated in the accompanying drawings, the entire bill including the sections 10a, 10b and 10c is handled as a unit but subsequently the section 10a is divided from the sections 10b and 10c. So long as the bills remain as a unit they may be related to a particular meter reader's book by forming notches as 33 and 34 in one end of the bill. However, when the section 10a is separated from the section 10b along the dividing line 11 it may be necessary to relate various separated sections as 10a to a particular meter reader's book. Therefore, perforations are formed in the section 10a adjacent to but in spaced relation with the dividing line 11, and in the course of preparing the bill notches 33' and 34' are extended from selected of these perforations to the dividing line 11, the notches 33' and 34' being located in positions identical with the locations of the notches 33 and 34. Therefore, when the section 10a is separated from the section 10b along the line 11, the section 10a may be handled in the same manner as that in which the entire bill was handled prior to such separation thereof, and therefore by resorting to the sorting method of the aforesaid Perkins patent, various sections as 10a may be sorted in a manner identical with that in which entire bills as 10 may be sorted prior to separation of such bills along lines as 11 therein.

While notches as 33 and 34 and 33' and 34' will serve to relate bills to a particular meter reader's book, it is important that it be determined that all of the bills related to a particular meter reader's book are collected in one group. To this end notches as 35 are extended from perforations arranged at the free end of the sections as 10a and these notches in the various bills are so formed as to in effect consecutively number the various bills. Therefore, in the course of utilization of the instruments of this invention, of which public utility bills are an example, when bills related to several different meter books are intermingled, it is possible by sorting the bills under control of perforations as either 33 and 34 or 33' and 34' to bring together all bills related to a particular source book such as the meter reader's book in public utility billing. Once the bills or instruments have been so grouped, another sorting may be made under control of slots as 35 to arrange the bills in consecutive numerical order whereupon it may be readily ascertained whether or not all of the bills related to a particular meter reader's book have been collected into a group.

Once the bills as 10 have been prepared in the manner illustrated in Figs. 1 and 2, they are arranged in the same order as the names and addresses appear in the meter reader's book which is the source of part of the variable data that are included on the bills.

In the present instance part of the variable data that are to appear on the bills, and which are derived from the meter reader's book, are a present meter reading as 36 and a past meter reading as 37. As is well understood, by subtracting a past meter reading from a present meter reading, a consumption quantity is ascertained. Heretofore in the course of preparation of utility bills, a manually operable printing calculating machine has been employed to print past and present meter readings on a utility bill, and such a machine also functions to print the consumption quantity on the bills. However, further manual operations were entailed on each individual bill when public utility bills were prepared according to prior conventional practices, but in accordance with my invention such additional manual and time-consuming operations are avoided for in the present instance it is only necessary for a machine operator to cause the present and past meter readings to be printed on the bill, and concurrently with this operation a representation of the consumption quantity is produced in the bills, and no other time-consuming manual operations are required.

A machine which may be employed for printing the past and present meter readings on the bill 10 and for producing representations of the consumption quantity in this bill may be one somewhat like that disclosed in Sundstrand Patent No. 2,194,270 patented March 19, 1940. It is to be noted, however, that a machine such as that disclosed in this patent is equipped to print items such as the present and past meter readings and the consumption quantity. However, in accordance with the present invention, a machine of the aforesaid character is modified so that the means which would ordinarily function to print the consumption quantity on a bill as 10 will function to produce notches as 38 in the bill and preferably, as in the case of other notches pertaining to numerical quantities, this means functions to produce these notches in accordance with the code described in the hereinabove referred to Nevin patent. Moreover, the notches are formed, as are the other notches hereinabove described, so that the bills as 10 may be sorted in accordance with the method disclosed in the hereinabove referred to Perkins patent.

It is, of course, important that the hereinabove referred to consumption quantity be accurately entered or, in the present instance, represented on the bill. This is assured by effecting what is referred to in the art as a cross-footing operation, the machine disclosed in the aforesaid Sundstrand Patent No. 2,194,270 being operative to effect such an operation.

This is effected in a machine of the aforesaid character by entering in the machine, for example, the present meter reading and thereafter entering the past meter reading. Furthermore, the consumption quantity, which will have been mentally subtracted and been written into the meter reader's book, is also entered into the machine, which is then set in operation to effect a subtracting operation in which the past meter reading is subtracted from the present meter reading. The machine then automatically compares the result of this subtracting operation with the consumption quantity already entered therein and if the two do not correspond, the machine locks up to prevent further operation, for lack of correspondence in these quantities indicates an error. If, however, the quantities do correspond, the machine is not locked up and further operations may be performed. In a machine for use in the present invention, such further operations entail operating the notching means to produce notches as 38 representative of the consumption quantity which, in the present instance where the present meter reading is 1824 and the past meter reading is 1778, is 46, and as the notching operation is effected, the present and past meter readings as aforesaid are printed on the bill.

It has been explained hereinabove that it is frequently necessary to enter certain special data on business instruments of the character to which this invention pertains. For example, in public utility billing, if the consumption quantity is equal to or less than a predetermined amount, known as the minimum quantity, a so-called minimum charge is made, which is not necessarily the consumption quantity times a particular rate but is rather a flat charge. Other examples of special data are an indication that a charge is to be made for merchandise that has been purchased by the customer or an indication that a bill is substantially greater than or less than that which is usually rendered the customer, a circumstance such as this necessitating an investigation to determine whether or not an error has been made. Furthermore, in some instances, the meter reader does not gain access to the meter and it is customary for utilities in instances such as this to estimate a bill for the current month and when this is done, data indicative of this are included on the bill. Additionally, if a customer has not paid a previous bill or, in other words, if the account is in arrears, this fact is also noticed on the bill.

In the present instance special data such as the foregoing, which it will be understood are exemplary of a wide variety of special data of this general character, may be entered or noticed on the bills as 10 by forming notches in association with selected of the perforations as 39 which, as can be ascertained by reference to Fig. 2, are associated with the word "Special" on the bills as 10. Each such perforation is devoted to a different item of the special data so that a notch formed in association with any such perforation will be representative of such data.

A machine of the character disclosed in the aforesaid Sundstrand Patent No. 2,194,270 is usually equipped with keys under control of which accounting data may be printed and where bills are being prepared by the use of such machine in accordance with the present invention, such keys are equipped to selectively operate suitable notching means, rather than the printing means which have been operated by such keys heretofore.

For the purpose of the present invention which, as will be explained hereinafter, there may be instances where the consumption quantity exceeds a predetermined quantity and where this is found to be true, such bills are preferably removed from the group so that the additional data that are to be entered in such unusual circumstances may be entered manually. This, however, will be a minor portion of the bills that are being prepared, and furthermore may be ascertained in the course of one of the sorting operations that are effected in accordance with the present invention, as will be explained hereinafter.

Moreover, it has been explained hereinabove that in certain instances the meter includes what is referred to as a meter constant and in such instances, as has been explained, the subtraction of a past meter reading from a present meter reading does not represent the true consumption quantity but rather the remainder in such a subtraction needs to be multiplied by the factor or constant. When this circumstance arises a notch is formed at the perforation 40. Furthermore, this fact will appear on the meter reader's book so that the likelihood of a consumption quantity, which should be multiplied by a factor, (as where the meter includes a constant) being improperly entered, is substantially mitigated. Moreover, as will be explained presently, by reason of the presence of a notch at the perforation 40, those bills which pertain to customers whose meters include a meter constant may be sorted from the remainder of the bills, which affords a positive check to assure that all consumption quantities which should be multiplied by a factor will have this operation performed with respect thereto.

Heretofore variable data, predicated upon the consumption quantity, have usually been entered on the utility bills at the time the consumption quantity was entered thereon and inasmuch as this entailed manually controlled calculating operations for each individual bill, an undue time consumption ensued in the preparation of the utility bills. This was particularly true since, as explained hereinabove, consumption quantities are charged for under rate schedules, and the rate schedule usually varies from customer to customer. Hence, even after a consumption quantity was ascertained, it has heretofore been necessary to determine the rate schedule under which a charge should be made for the consumption quantity and once the rate schedule was ascertained, calculating operations were thereafter performed to determine the charge.

In the present instance, however, representations of the rate schedule are produced in the bills as an incident to the preparation thereof to the extent shown in Figs. 1 and 2. Furthermore, the consumption quantity is entered on the bill when it is prepared to the extent illustrated in Fig. 3 and, as just explained, this is done much more expeditiously than it has heretofore been possible to prepare bills to this extent.

However, when the bills have been prepared to the extent illustrated in Fig. 3, a striking benefit of my invention is realized, for in place of performing a calculating operation for each bill to effect entry of the amount to be charged for the particular consumption quantity, it is only necessary to effect sorting and printing operations, both of which may be performed economically and rapidly, and thereafter the charge for the consumption quantity and the consumption quantity itself, in accordance with the present arrangement, are printed on the business instruments.

It will be appreciated that when a large number of public utility bills are being prepared concurrently, a great many of the bills will include the same rate schedule. Furthermore, it has been ascertained that a great many bills having the same rate schedule will have the same consumption quantity entered thereon. Hence, after the bills have been prepared to the extent illustrated in Fig. 3, in the manner hereinabove described, two sorting operations are effected, in the present instance, in accordance with the method disclosed in the hereinabove referred to Perkins patent. In the first of these sorting operations, all those bills bearing a like rate schedule designation are sorted into a group, all bills in each such group bearing the same rate schedule designation. The result of this sorting operation will be the grouping together of a relatively large number of public utility bills.

Once this sorting operation has been effected, each group is subjected to a further sorting operation to bring all of the bills in the group bearing representations of the same consumption quantity into a group, it being understood that each bill in each such group will bear representations of the same consumption quantity. It will, therefore, be appreciated that when these two sorting operations are completed, all bills for which a charge is to be made at the same rate schedule will be grouped in what may be termed a major group and all bills within this major group having a like consumption quantity for which a charge is to be made at the particular rate schedule will be grouped in what may be termed a minor or subgroup. In grouping the bills in accordance with the second of the aforesaid two sorts, the bills are brought into a consecutive arrangement, which is to say, all bills having the lowest consumption quantity, for example 2, are arranged first in such consecutive arrangement and thereafter those having the next highest consumption quantity, for example 4, are arranged next in order, and so on through to the highest consumption quantity that is to be handled in accordance with the present invention.

Once the various bills have been grouped in the manner just explained all that need be done on the bills in each group is to print in the areas 42, 43 and 44 on each bill in each group identical numerical data. This will entail only a simple printing operation which may be effected in any desired manner although preferably this is effected in the manner explained in my copending application Serial No. 470,265, filed December 26, 1942, as a division of this application. Since, therefore, only a simple printing operation is entailed, the preparation of business instruments is materially expedited.

It has been explained hereinabove that notches are selectively formed in association with the perforations 39 in instances where, for example, other data are to be entered on the bill. Thus, if there is to be a charge for merchandise or if there are errors or other similar circumstances, prior to the time the bills are separated along the line 11, those bills bearing notches selectively located in association with the perforations 39 are sorted from the other bills and in any desired manner other such data, that are to be entered on the bills, are entered thereon.

The accounting stub 10a which is retained by the utility may be used in a wide variety of ways among which is the separation of such stubs in accordance with the revenue number that appears thereon which, as explained hereinabove, enables the utility to determine the consumption by each of various classes of customers. Furthermore, the presence or absence of a notch at the perforation 42a indicates that a bill bearing such a notch is tax free. Thus a sorting may be performed in connection with the method disclosed in the above referred to Perkins patent, and all stubs bearing a notch at perforation 42a are eliminated and thereafter the amount of tax that ' to be paid on the remaining bills of the utility may be ascertained.

It will be appreciated that the accounting stub 10a can be used for a wide variety of other purposes, depending upon the data that is represented therein by selectively located notches formed in association with selected of the perforations P, the foregoing being exemplary of such usages.

Hereinabove I have referred to affording representations of numerical values in accordance with the code described in Nevin Patent No. 2,041,085, but it will be understood that in so far as the present invention is concerned this is optional, for numerical values, if desired, could be directly represented or they could be represented in accordance with any other suitable code.

Moreover, I have described the sorting as being effected in the manner described in Perkins Patent No. 1,544,172, but it will be understood that sorting could be effected in a wide variety of other ways which might entail forming perforations at selected positions within the body of the instrument, and perforations at such selected positions would serve to enable the sorting to be brought about. Such arrangement of openings for the purpose of sorting and the like is well understood in the art as is the method of sorting described in the Perkins patent, and in so far as the present invention is concerned the thing of primary importance in so far as sorting is concerned is that it be possible to sort the instruments in the course of preparation thereof at the times and in the manner described hereinabove.

It will be manifest from the foregoing description that I have provided a novel utility bill and while I have illustrated and described a selected embodiment of my invention, it is to be understood that this is capable of variation and modification and I therefore do not wish to be limited to the precise details set forth but desire to avail myself of such changes and alterations as fall within the purview of the following claims:

I claim:

1. A business instrument or the like comprising a body of sheet material and including a main section and at least one supplemental section and in which such sections are joined one to the other in endwise alignment along a line of severance extended substantially parallel to opposite edges of the body and in spaced relation therewith whereby, until the sections are divided along such a line of severance, the sections may be handled as a unit, the portion of such body affording the main section being located at one end of the body and having a plurality of spaced apart perforations formed therein along at least selected of the free marginal edges thereof with one or more notches each extended from a perforation to the adjacent free marginal edge of said main section enabling sorting among a plurality of business instruments or the like similarly arranged, said supplemental section having a plurality of spaced apart perforations in the marginal portion thereof at the end thereof opposite that at which said main section is located with one or more other notches each extended from a perforation to the adjacent free marginal edge enabling sorting of the business instrument or the like among a plurality of business instruments or the like similarly arranged, said main section having a plurality of spaced apart perforations in the marginal portion thereof adjacent the line of severance between this and the adjacent supplemental section with one or more perforations, positioned to correspond with the one or more other notches which are extended to said free marginal edge of the supplemental section and each extended from a perforation to the line of severance so as to assume the form of notches when said main section is separated along said line of severance and enabling said main section to be sorted among the plurality of such main sections in the same manner as the original business instrument or the like before such severance may be sorted among a plurality of such business instruments or the like.

2. A business instrument or the like comprising a body of sheet material and including a main section and at least one supplemental section and in which such sections are joined one to the other in endwise alignment along a line of severance extended substantially parallel to opposite edges of the body and in spaced relation therewith whereby, until the sections are divided along such lines of severance, the sections may be handled as a unit, at least one of said sections having a plurality of perforations formed therein in juxtaposition to said line of severance and having a portion thereof intermediate at least one of such perforations and the line of severance cut away between such perforation and the line of severance whereby at least one opening leading to the free edge of such section from a perforation is afforded when the sections are separated along the line of severance whereby a member passed into said perforation may be moved freely away from said perforation and beyond the adjacent edge of the section without imparting movement to said section to thereby enable sorting or other handling of the section.

HAROLD M. WHITTLESEY.